UNITED STATES PATENT OFFICE.

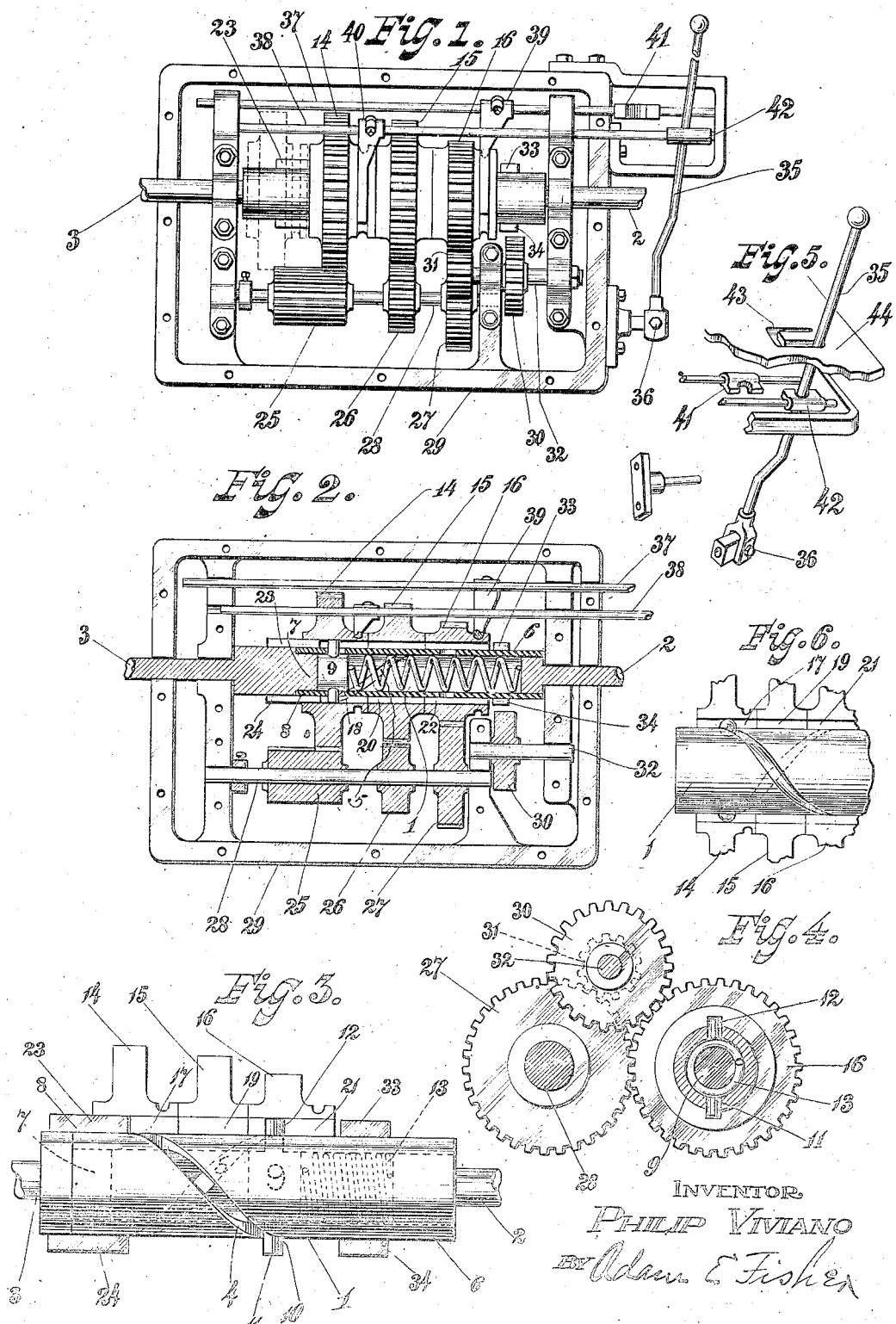

PHILIP VIVIANO, OF ST. LOUIS, MISSOURI.

AUTOMATIC CHANGE-SPEED TRANSMISSION.

1,391,707.   Specification of Letters Patent.   Patented Sept. 27, 1921.

Application filed August 15, 1918. Serial No. 250,035.

*To all whom it may concern:*

Be it known that I, PHILIP VIVIANO, a subject of the King of Italy, residing in the city of St. Louis and State of Missouri, have invented new and useful Improvements in Automatic Change-Speed Transmissions, of which the following is a specification, reference being had to the accompanying drawings.

This invention pertains to changeable speed power transmission systems or mechanisms, especially as applied to automobiles and for similar purposes, and has for its object the production of a flexible change speed power transmission mechanism of this character which will be automatic in operation, and which will automatically shift from one speed to another, and from a higher to a lower speed as the load increases, and vice versa, thus automatically adjusting itself to the load to be carried.

Another object is to produce such mechanism as will obviate the use of the gear shift lever except for neutral and reverse positions, or for special uses.

A further object is to produce a mechanism of this character in a simple, practical and efficient form, and best adapted to produce the desired results.

With these and other objects in view as will appear in the course of this specification, attention is called to the accompanying drawings, wherein—

Figure 1 is a top plan view of my gear assembly and automatic shift mechanism;

Fig. 2 is a horizontal sectional view of the same;

Fig. 3 is a detail of the tubular connecting link between the ends of the main drive shaft, and showing the adjustment worms cut through the wall thereof;

Fig. 4 is a detail frontal elevation showing the arrangement of the forward reverse gears, and a cross section of the spiral tubular shaft;

Fig. 5 is a detail of the gear shift lever and mounting, which gear shift lever is used only for throwing the mechanism in neutral position, or in reverse position;

Fig. 6 is a detail view of a modification of a portion of the adjustment worm and dog construction shown in Fig. 3.

Referring more particularly to the drawings, the basis of my invention resides in a connecting link 1 between the forward end 2 of the main drive shaft and the rear end 3 thereof. In the construction shown in the drawings, this connecting link 1 is tubular as shown, and has cut through the wall thereof the two oppositely disposed adjustment worms 4 and 5. These worms each extend half around the circumference of the tubular link 1 and are located diametrically opposite one to the other, both running in the same relative direction. The forward end 6 of the link 1 is rigidly joined to the end 2 of the main drive shaft. The end 3 of the main drive shaft has a bearing 7 adapted to loosely receive and retain the rear end 8 of the link 1 and so that same may freely revolve thereon. Within the tubular link 1 as shown in Fig. 3 is located the cylindrical head 9 adapted to slide freely back and forth within said link. A pin 10 passes through said head 9 and the ends thereof extend out and project through the said adjustment worms 4 and 5, so as to form the projecting traveling dogs 11 and 12. A coil spring 13 is located between the end 2 of the main drive shaft, and the cylindrical head 9, the purpose of which is normally to throw the traveling head 9 backward to the position shown in Fig. 2 whenever the load lightens sufficiently, or as the speed increases.

Upon this link 1 and assembly as described, are mounted the variable gears 14, 15 and 16, same being of different diameters as may be required in practice, and for the purpose of accommodating the mechanism to different speeds. These gears 14, 15 and 16 have guide-ways 17, 18, 19, 20, 21 and 22 cut transversely along their inner faces and paralleling the tubular link 1, adapted to receive the traveling dogs 11 and 12. In respect of gear 14, feathers or keys 23 and 24 are rigidly attached to the end 3 of the main drive shaft, and are adapted, likewise, to slide within the guide-ways 17 and 18 of the gear 14. A series of complementary gears 25, 26 and 27 are mounted upon the counter shaft 28 journaled in the frame or case 29. These complementary gears 25, 26 and 27 are of a diameter to mesh respectively with the gears 14, 15 and 16, and are rigidly mounted upon the shaft 28. The gear 25 is of a length sufficient compared to the gear 14 to enable the gear 14 to travel longitudinally along the tubular link 1, for a purpose hereinafter described. Reverse gears 30 and 31 are rigidly mounted upon the counter shaft 32 in such position that the gear 31 is permanently in mesh with the gear 27, and so that the gear 30 is adapted to mesh with the gear 16 when the latter gear is shifted forwardly along the tubular link 1. Feathers or keys 33 and 34 are rigidly mounted at the forward end of the tubular link 1 and adapted to engage the guide-ways 21 and 22 of the gear 16 when said gear is shifted forwardly.

A gear shift lever 35 is pivoted at the point 36 to the frame or case 29, and gear shift rods 37 and 38 are slidingly mounted upon the frame 29, the gear shift rod 37 being provided at its forward end with the fork 39, engaging the gear 16, and with the gear shift rod 38 provided with the fork 40, engaging the gear 14. Both of said forks 39 and 40 are rigidly mounted upon their respective rods. The forward ends of said gear shift rods 37 and 38 are provided with latches 41 and 42 for engaging the gear shift lever 35. The gear shift lever 35 follows a U-shaped course as indicated at 43, cut through the base plate 44. This gear shift lever 35 is used only for throwing the mechanism into neutral position, or into reverse position.

In operation, as the main drive shaft revolves, revolving also the tubular link 1 clockwise for example, the traveling dogs 11 and 12 will be propelled forwardly by the action of the adjustment worms 4 and 5, along the guide-ways 17, 18, 19, 20, 21 and 22 cut transversely in the bearings of the gears 14, 15 and 16 until the proper gear is reached of a diameter sufficiently less than its complementary gear to enable the traveling dogs 11 and 12 to rotate said gear and move the load, or propel the vehicle forward. In this way the heavier the load, the farther forward will be the travel of the dogs 11 and 12, and as the load lightens, the dogs will automatically move backward. The spring 13 will facilitate the backward movement of the dogs 11 and 12 when the load is lightened, or, what amounts to the same, as the speed increases.

The action is, of course, reversed to throw the mechanism back into gear with the engine. To reverse the mechanism, the gear shift lever 35 is brought into engagement with the latch 41, and thrown forwardly, whereby the gear 16 is drawn forwardly into mesh with the gear 30, thereby rotating the gear 31, which is in mesh with the gear 27, causing the travel of the mechanism to be reversed. The relative strength of the spring 13 should, of course, be less than the power of the engine, so as to enable the engine readily to overcome the tension of the spring.

In practice, a ball and run-way construction may be used as shown in Fig. 6, instead of the adjustment worms and dogs. In this case a collar would be set around the outside of the tubular link 1, and the spring 13 would likewise be located on the outside of said link.

It may be found in practice that the spring 13 is unnecessary. The gears may be increased in number as desired, and the pitch of the adjustment worms may be increased or decreased, to give the required range and flexibility of action.

It is obvious that other modifications may be made in the form of construction, and assembling the elements of my invention, without departing from the spirit of my invention as laid down in the appended claims.

What I claim to be new and patentable is:

1. An automatic change speed transmission, comprising a supporting frame; a tubular link rigidly joined to the driving shaft and having a free bearing on the driven shaft; two oblique adjustment worms cut through the opposite walls of said link; a cylindrical head slidingly mounted within said tubular link; a pin rigidly set through said head with its ends projecting through said adjustment worms to form dogs; a counter-shaft journaled in the frame parallel to said tubular link and spaced therefrom as required; keys rigidly joined to the ends of the driving and driven shafts adjacent said link; a set of variable primary gears freely mounted on said tubular link, and the two end gears being adapted to longitudinal movement along same; alined key-ways cut across the bearings of said gears and adapted to engage both the shaft keys and the projecting dogs aforesaid; a set of secondary, variable gears rigidly mounted on said counter-shaft in mesh with their respective primary gears, the high speed secondary gear being of a width sufficient to permit the aforesaid longitudinal travel of the high speed primary gear; a reverse gearset mounted forwardly in permanent mesh with said secondary gears and adapted to mesh with the forward primary gear when same is moved forward and engages the key on the driving shaft; and means for moving the primary end gears back and forth into and out of engagement with the shaft keys as required.

2. An automatic change speed transmission, comprising a supporting frame; a tubular link rigidly joined to the driving shaft and having a free bearing on the driven shaft; two oblique adjustment worms cut through the opposite walls of said link; a cylindrical head slidingly mounted within said tubular link; a pin rigidly set through said head with its ends projecting through said adjustment worms to form dogs; a counter-shaft journaled in the frame parallel to said tubular link and spaced therefrom as required; keys rigidly joined to the ends of the driving and driven shafts adjacent said link; a set of variable primary gears freely mounted on said tubular link, and the two end gears being adapted to longitudinal movement along same; alined key-ways cut across the bearings of said gears and adapted to engage both the shaft keys and the projecting dogs aforesaid; a set of secondary, variable gears rigidly mounted on said counter-shaft in mesh with their respective primary gears, the high speed secondary gear being of a width sufficient to permit the aforesaid longitudinal travel of the high speed primary gear; a reverse gearset mounted forwardly in permanent mesh with said secondary gears and adapted to mesh with the forward primary gear when same is moved forward and engages the key on the driving shaft; means for normally throwing the sliding, cylindrical head toward the driven shaft; and means for moving the primary end gears back and forth into and out of engagement with the shaft keys as required.

3. An automatic change speed transmission, comprising a supporting frame; a tubular link rigidly joined to the driving shaft and having a free bearing on the driven shaft; two oblique adjustment worms cut through the opposite walls of said link; a cylindrical head slidingly mounted within said tubular link; a pin rigidly set through said head with its ends projecting through said adjustment worms to form dogs; a counter-shaft journaled in the frame parallel to said tubular link and spaced therefrom as required; keys rigidly joined to the ends of the driving and driven shafts adjacent said link; a set of variable primary gears freely mounted on said tubular link, and the two end gears being adapted to longitudinal movement along same; alined key-ways cut across the bearings of said gears and adapted to engage both the shaft keys and the projecting dogs aforesaid; a set of secondary, variable gears rigidly mounted on said counter-shaft in mesh with their respective primary gears, the high speed secondary gear being of a width sufficient to permit the aforesaid longitudinal travel of the high speed primary gear; a reverse gearset mounted forwardly in permanent mesh with said secondary gears and adapted to mesh with the forward primary gear when same is moved forward and engages the key on the driving shaft; a coil spring between the sliding, cylindrical head and the end of the drive shaft to normally throw said head toward the driven shaft; and means for moving the primary end gears back and forth into and out of engagement with the shaft keys as required.

PHILIP VIVIANO.

Witnesses:
S. D'ALESSANDRO,
VICTOR J. BRUNELLY.